US012250122B2

(12) United States Patent
Tamura et al.

(10) Patent No.: US 12,250,122 B2
(45) Date of Patent: Mar. 11, 2025

(54) NETWORK NODE APPARATUS AND METHOD

(71) Applicant: NEC Corporation, Tokyo (JP)

(72) Inventors: Yusuke Tamura, Tokyo (JP); Toshihiro Ikeda, Tokyo (JP); Taku Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 58 days.

(21) Appl. No.: 18/367,749

(22) Filed: Sep. 13, 2023

(65) Prior Publication Data

US 2024/0106712 A1 Mar. 28, 2024

(30) Foreign Application Priority Data

Sep. 26, 2022 (JP) .................................. 2022-152879

(51) Int. Cl.
*H04L 41/0895* (2022.01)
*H04L 41/0823* (2022.01)

(52) U.S. Cl.
CPC ...... *H04L 41/0895* (2022.05); *H04L 41/0823* (2013.01)

(58) Field of Classification Search
CPC . H04L 65/1073; H04L 41/5058; H04L 67/51; H04W 48/18; H04W 60/00
See application file for complete search history.

(56) References Cited

U.S. PATENT DOCUMENTS

| 2020/0145833 A1* | 5/2020 | Thakolsri | H04W 24/02 |
| 2021/0297977 A1* | 9/2021 | Prabhakar | H04W 8/06 |
| 2022/0330139 A1* | 10/2022 | Lee | H04W 60/04 |

FOREIGN PATENT DOCUMENTS

| WO | WO-2019095889 A1 * | 5/2019 | ............ H04W 36/00 |
| WO | 2022/054267 A1 | 3/2022 | |

OTHER PUBLICATIONS

"Ultra Cloud Core 5G Session Management Function, Release Feb. 2020—Configuration and Administration Guide" (Year: 2020).*
A. Farrel, "Recent Developments in Service Function Chaining (SFC) and Network Slicing in Backhaul and Metro Networks in Support of 5G," 2018 20th International Conference on Transparent Optical Networks (ICTON), Bucharest, Romania, 2018, pp. 1-4, (Year: 2018).*
Addad, R. A., Bagaa, M., Cadette Dutra, D. L., & Flinck, H. (2020). Optimization model for cross-domain network slices in 5G networks. IEEE Transactions on Mobile Computing, 19(5), 1156-69. (Year: 2020).*
C. H. T. Arteaga, A. Ordoñez and O. M. C. Rendon, "Scalability and Performance Analysis in 5G Core Network Slicing," in IEEE Access, vol. 8, pp. 142086-142100, 2020, (Year: 2020).*

* cited by examiner

*Primary Examiner* — Messeret F Gebre
(74) *Attorney, Agent, or Firm* — Sughrue Mion, PLLC (57) ABSTRACT

A network node apparatus (SMF) responsible for a Session Management Function (SMF) in a core network includes: an obtaining unit configured to obtain network function information including information elements respectively related to network slices supported by the SMF; and a first communication processing unit configured to transmit the network function information to a network node apparatus responsible for a Network Repository Function (NRF) in the core network. The information elements respectively related to the network slices supported by the SMF have been aggregated within the network function information according to a predetermined rule.

7 Claims, 12 Drawing Sheets

| COMPANY A | XX LTE NET DATA CONTRACT | XX.XX-net.ne.jp |
| | XX LTE NET DATA 2 CONTRACT | XXYY.XX-net.ne.jp |

92

| COMPANY A | XX LTE NET DATA CONTRACT | XX-net.ne.jp |
| | XX LTE NET DATA 2 CONTRACT | |

NETWORK NODE APPARATUS AND METHOD

CROSS-REFERENCES TO RELATED APPLICATION

The present application claims priority to Japanese patent application No. JP 2022-152879 filed on Sep. 26, 2022, the content of which is hereby incorporated by reference in its entirety.

BACKGROUND

Technical Field

The present invention relates to a network node apparatus and a method.

Background Art

In a core network of fifth generation systems (5th generation core network (5GC)) in mobile communication, a network node as a target to be connected to (hereinafter also referred to as a correspondent node) is selected via a Network Repository Function (NRF) in the core network.

A method of selecting the correspondent node will be described below. As a concrete example, a case is assumed in which an Access and Mobility management Function (AMF) selects a Session Management Function (SMF).

First, an SMF performs a Network Function (NF) registration request to an NRF. In other words, the SMF performs a registration request for an NF Profile being SMF information. Next, an AMF performs an NF discovery request to the NRF. Next, the NRF searches for the SMF that matches NF information that has been requested from the AMF, and returns the search results to the AMF. In response to the reply from the NRF, the AMF performs a connection request to the related SMF.

PTL 1 provides description of a technique related to network slicing, by which a plurality of virtualized logical networks is constructed on a physical network, in order to support service requirements of a certain communication service.

[PTL 1] WO 2022/054267

SUMMARY

When network slicing described above is applied, information elements respectively related to slices supported by the SMF are configured in the NF Profile being SMF information. In other words, information elements related to the respective slices need to be configured in individual NF Profiles. Thus, when a large number of slices needs to be registered with the NRF, this increases pieces of information necessary for registration as well.

An example object of the present invention is to provide a network node apparatus and a method that allow information elements respectively related to network slices supported by an SMF to be appropriately registered with an NRF.

According to one example embodiment of the present invention, a network node apparatus responsible for a Session Management Function (SMF) in a core network, the network node apparatus including: an obtaining unit configured to obtain network function information including information elements respectively related to network slices supported by the SMF; and a communication processing unit configured to transmit the network function information to a network node apparatus responsible for a Network Repository Function (NRF) in the core network, wherein the information elements respectively related to the network slices supported by the SMF have been aggregated within the network function information according to a predetermined rule.

According to one example embodiment of the present invention, a network node apparatus responsible for a Network Repository Function (NRF) in a core network, the network node apparatus including: a communication processing unit configured to receive, from a network node apparatus responsible for a Session Management Function (SMF) in the core network, network function information including information elements respectively related to network slices supported by the SMF; and a registration processing unit configured to perform registration of the network function information, wherein the information elements respectively related to the network slices supported by the SMF have been aggregated within the network function information according to a predetermined rule.

According to one example embodiment of the present invention, a method performed by a network node apparatus responsible for a Session Management Function (SMF) in a core network, the method including: obtaining network function information including information elements respectively related to network slices supported by the SMF; and transmitting the network function information to a network node apparatus responsible for a Network Repository Function (NRF) in the core network, wherein the information elements respectively related to the network slices supported by the SMF have been aggregated within the network function information according to a predetermined rule.

According to one example embodiment of the present invention, a method performed by a network node apparatus responsible for a Network Repository Function (NRF) in a core network, the method including: receiving, from a network node apparatus responsible for a Session Management Function (SMF) in the core network, network function information including information elements respectively related to network slices supported by the SMF; and performing registration of the network function information, wherein the information elements respectively related to the network slices supported by the SMF have been aggregated within the network function information according to a predetermined rule.

According to the present invention, information elements respectively related to network slices supported by an SMF can be appropriately registered with an NRF. Note that, according to the present invention, instead of or together with the above effects, other effects may be exerted.

DESCRIPTION OF THE EXAMPLE EMBODIMENTS

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of Present Invention
2. Configuration of System
3. First Example Embodiment
   3.1. Configuration of SMF 100
   3.2. Configuration of NRF 200
   3.3. Configuration of AMF 300
   3.4. Operation Example
4. Second Example Embodiment
   4.1. Configuration of First Network Node Apparatus 150
   4.2. Configuration of Second Network Node Apparatus 250
   4.3. Operation Example
5. Other Example Embodiments

1. OVERVIEW OF EXAMPLE EMBODIMENTS OF PRESENT INVENTION

First, an overview of example embodiments of the present invention will be described.

(1) Technical Issue

In a core network of fifth generation systems (5th generation core network (5GC)) in mobile communication, a network node as a target to be connected to (hereinafter also referred to as a correspondent node) is selected via a Network Repository Function (NRF) in the core network.

A method of selecting the correspondent node will be described below. As a concrete example, a case is assumed in which an Access and Mobility management Function (AMF) selects a Session Management Function (SMF).

Figure 1:
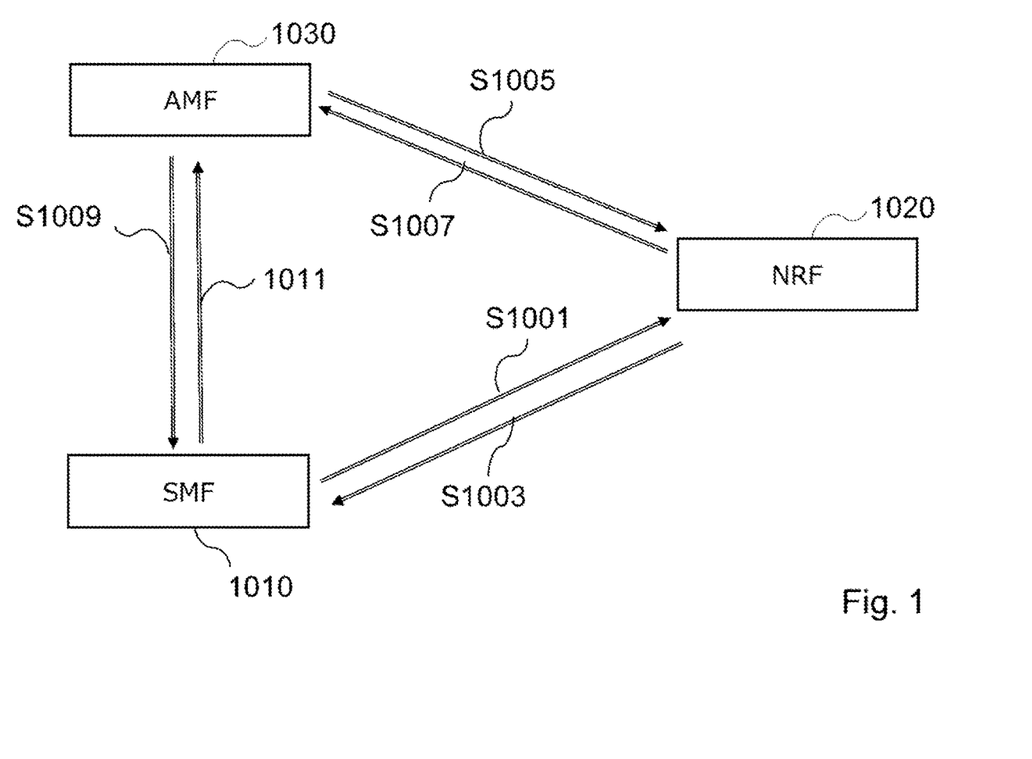
FIG. 1 is an explanatory diagram illustrating an example of a configuration of each network function when a correspondent node is selected.

FIG. 1 is an explanatory diagram illustrating an example of a configuration of each network function when a correspondent node is selected. With reference to FIG. 1, an SMF 1010 performs a Network Function (NF) registration request to an NRF 1020 (S1001). In other words, the SMF 1010 performs a registration request for an NF Profile being SMF information, and the NRF 1020 returns registration results to the SMF (S1003). Next, an AMF 1030 performs an NF discovery request to the NRF 1020 (S1005). Next, the NRF 1020 searches for the SMF (SMF 1010) that matches NF information that has been requested from the AMF 1030, and returns the search results to the AMF 1030 (S1007). In response to the reply from the NRF 1020, the AMF 1030 performs a connection procedure to the related SMF (SMF 1010) (S1009, S1011).

In such a procedure, when network slicing is applied, information elements respectively related to slices supported by the SMF are configured in the NF Profile being SMF information.

Figure 2:
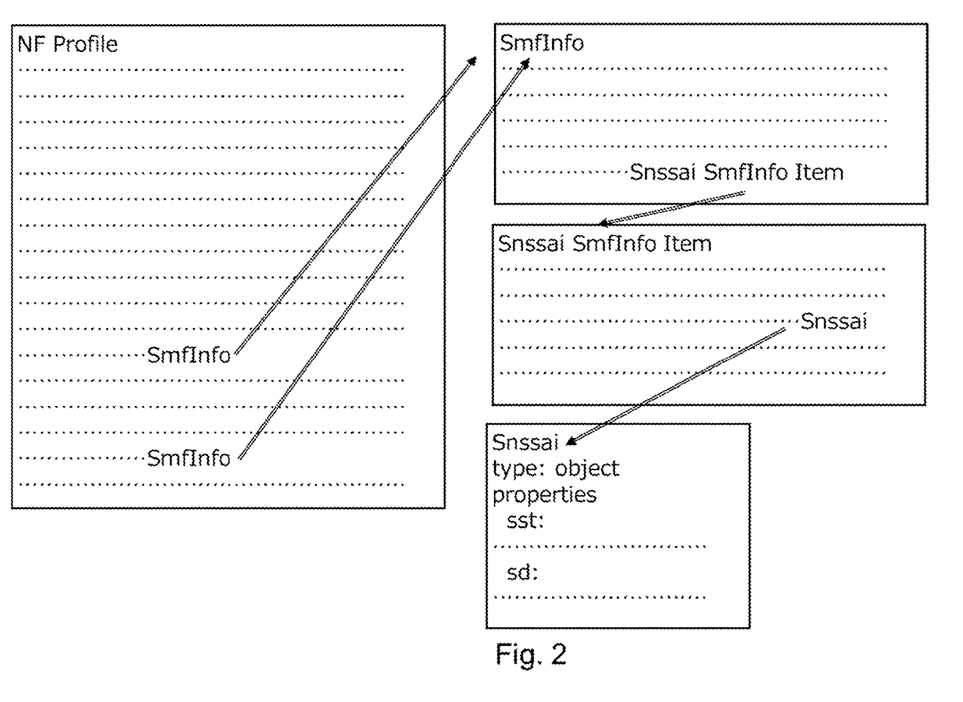
FIG. 2 is an explanatory diagram illustrating an example of NF Profile information including information elements respectively related to slices supported by an SMF.

FIG. 2 is an explanatory diagram illustrating an example of NF Profile information including information elements respectively related to slices supported by the SMF. With reference to FIG. 2, the NF Profile information includes SmfInfo, SmfInfo includes Single Network Slice Selection Assistance Information (Snssai) SmfInfo Item related to a target slice, and Snssai SmfInfo Item includes Snssai.

As illustrated in FIG. 2, in the NF Profile information, information elements respectively related to the slices supported by the SMF are configured. Here, when the SMF supports a plurality of network slices, information elements related to the respective slices need to be configured in individual pieces of NF Profile information. Thus, when a large number of slices needs to be registered with the NRF, this results in increasing corresponding pieces of information as well.

Figure 3:
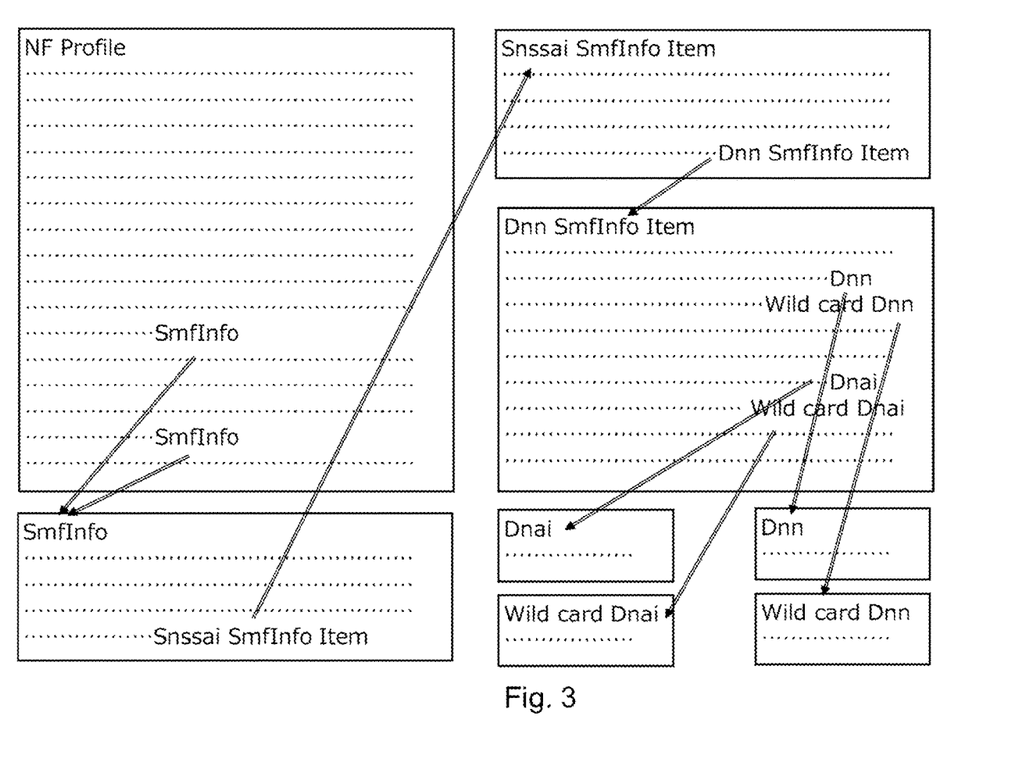
FIG. 3 is an explanatory diagram illustrating an example of the NF Profile information including the information elements respectively related to the slices supported by the SMF and Data network names (Dnns)

FIG. 3 is an explanatory diagram illustrating an example of the NF Profile information including the information elements respectively related to the slices supported by the SMF and Data network names (Dnns). With reference to FIG. 3, the NF Profile information includes SmfInfo. SmfInfo includes Single Network Slice Selection Assistance Information (Snssai) SmfInfo Item related to a target slice. Snssai SmfInfo Item includes Dnn SmfInfo Item. Dnn SmfInfo Item includes Dnn, Wildcard Dnn, Data Network Access Identifier (Dnai), and Wild card Dnai.

As illustrated in FIG. 3, Dnn information is also registered in the NF Profile information. Here, the Dnn information is registered in an individual piece of NF Profile information, or is entirely designated with a wild card and is registered. Thus, when a part of Dnns out of a plurality of Dnns are registered, the Dnns need to be individually configured.

As described above, when information elements respectively related to a large number of slices and a large amount of Dnns are registered, this increases pieces of information to be registered and thus increases the size of signals handling NF Profile such as NF Register and NF discovery. This may be a cause of deterioration of processing performance. In addition, this results in increasing time and efforts for maintenance and operation as well.

An example object of the present example embodiment is to provide a network node apparatus and a method that allow information elements respectively related to network slices supported by an SMF to be appropriately registered with an NRF.

(2) Operation Example

In an example embodiment of the present invention, for example, a network node apparatus responsible for a Session Management Function (SMF) in a core network obtains network function information including information elements respectively related to a plurality of network slices supported by the SMF, and transmits the network function information to a network node apparatus responsible for a Network Repository Function (NRF) in the core network. The information elements respectively related to the plurality of network slices supported by the SMF have been aggregated within the network function information according to a predetermined rule.

In an example embodiment of the present invention, for example, a network node apparatus responsible for a Network Repository Function (NRF) in a core network receives, from a network node apparatus responsible for a Session Management Function (SMF) in the core network, network function information including information elements respectively related to a plurality of network slices supported by the SMF, and performs registration of the network function information. The information elements respectively related to the plurality of network slices supported by the SMF have been aggregated within the network function information according to a predetermined rule.

With this, for example, information elements respectively related to network slices supported by an SMF can be appropriately registered with an NRF.

Note that the technical features described above are merely a concrete example of the example embodiments of the present invention, and as a matter of course, the example embodiments of the present invention are not limited to the technical features described above.

2. CONFIGURATION OF SYSTEM

Figure 4:
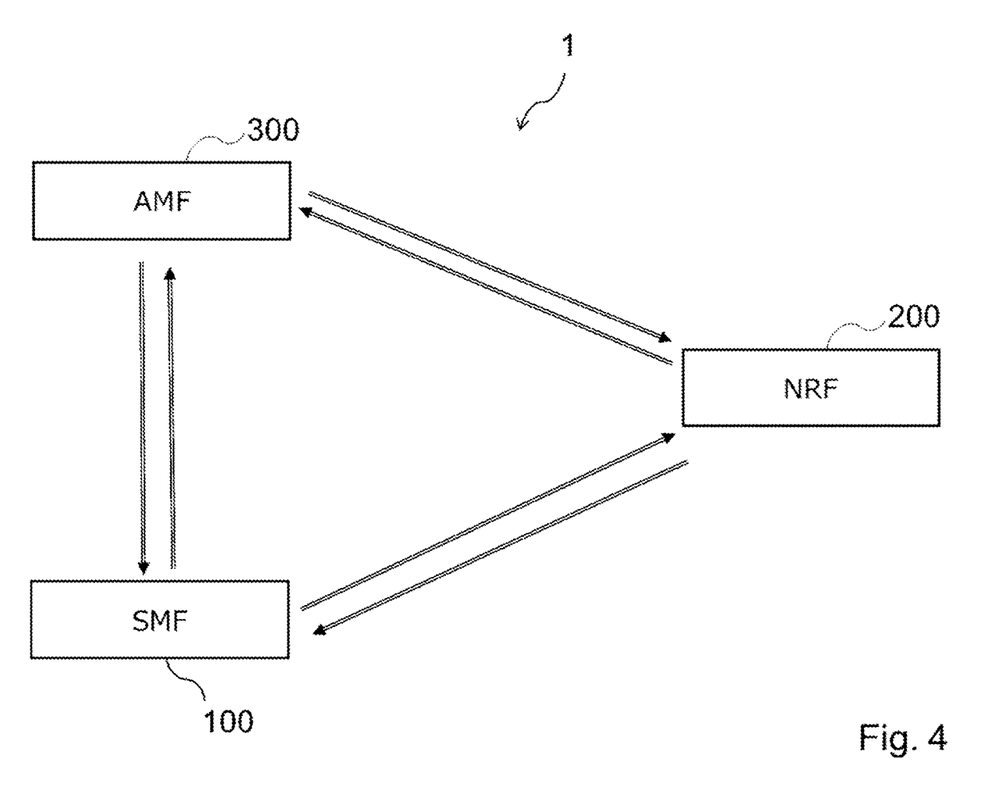
FIG. 4 is an explanatory diagram illustrating an example of a schematic configuration of a system 1 according to an example embodiment of the present invention.

With reference to FIG. 4, an example of a configuration of a system 1 according to an example embodiment of the present invention will be described. FIG. 4 is an explanatory diagram illustrating an example of a schematic configuration of the system 1 according to an example embodiment of the present invention. With reference to FIG. 4, the system 1 includes a network node apparatus 100 (hereinafter also referred to as an SMF 100) responsible for an SMF, a network node apparatus 200 (hereinafter also referred to as an NRF 200) responsible for an NRF, and a network node apparatus 300 (hereinafter also referred to as an AMF 300) responsible for an AMF.

For example, the system 1 is a system conforming to standards/specifications of the Third Generation Partnership Project (3GPP). Specifically, for example, the system 1 is a system conforming to standards/specifications of the fifth generation (5G)/New Radio (NR). As a matter of course, the system 1 is not limited to these examples.

3. FIRST EXAMPLE EMBODIMENT

Figure 5:
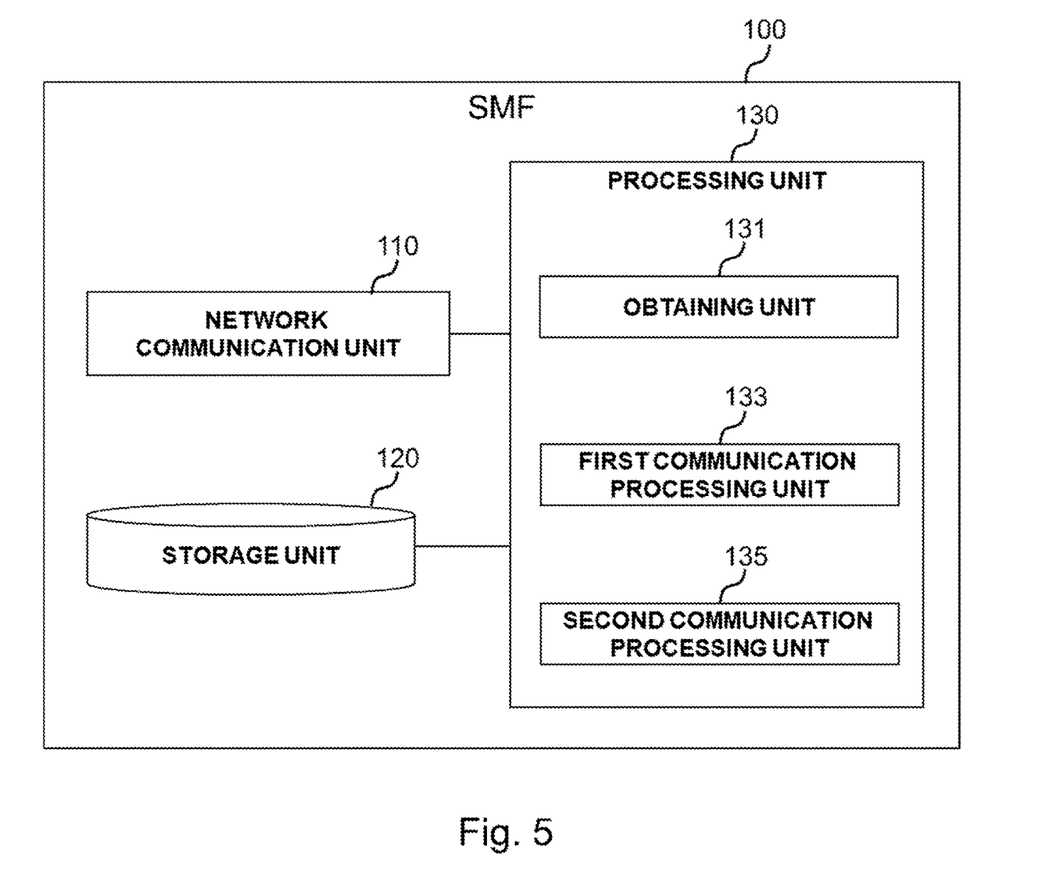
FIG. 5 is a block diagram illustrating an example of a schematic configuration of an SMF 100 according to a first example embodiment.
Figure 6:
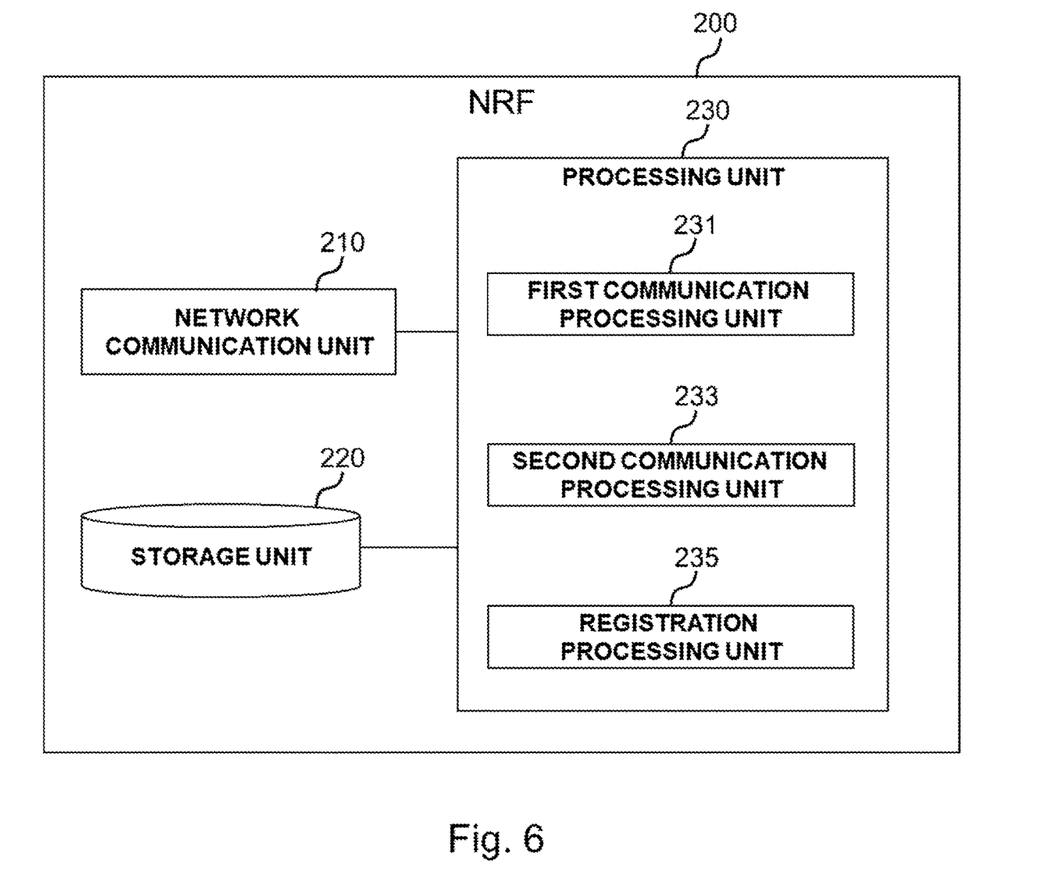
FIG. 6 is a block diagram illustrating an example of a schematic configuration of an NRF 200 according to the first example embodiment.
Figure 7:
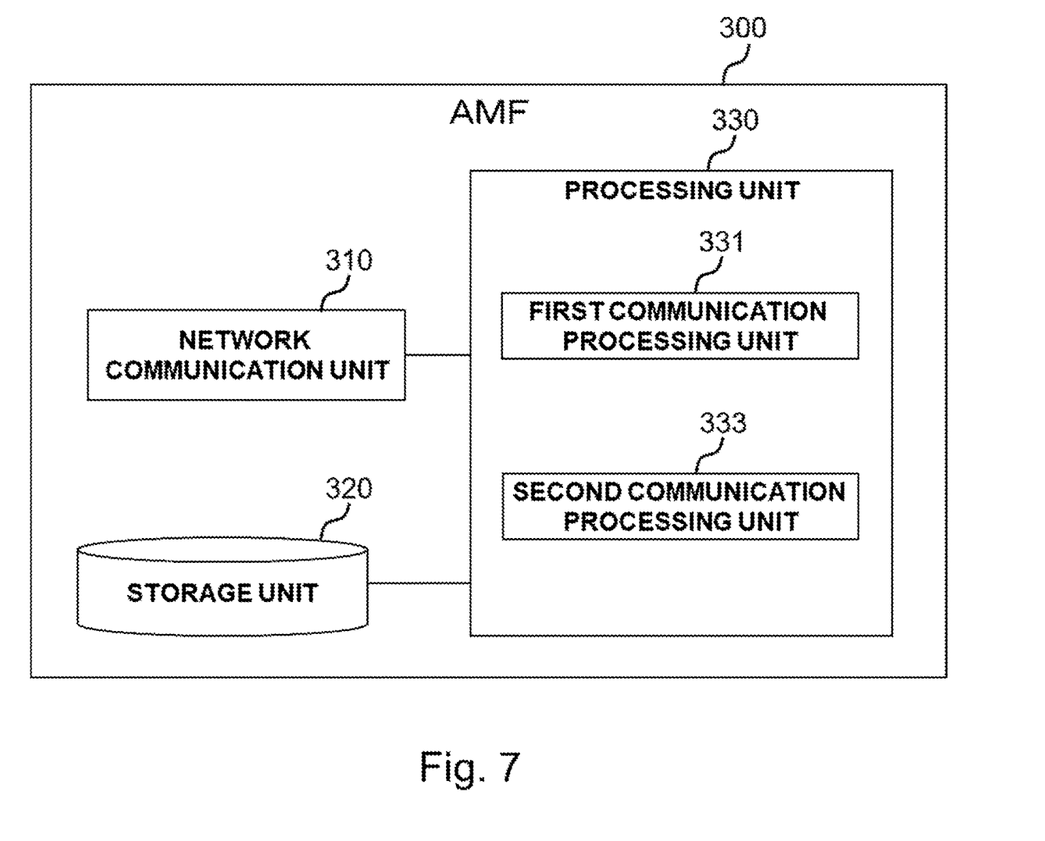
FIG. 7 is a block diagram illustrating an example of a schematic configuration of an AMF 300 according to the first example embodiment.

Next, with reference to FIG. 5 to FIG. 7, a first example embodiment of the present invention will be described.

3.1. Configuration of SMF 100

Next, with reference to FIG. 5, an example of a configuration of the SMF 100 according to the first example embodiment will be described. FIG. 5 is a block diagram illustrating an example of a schematic configuration of the SMF 100 according to the first example embodiment. With reference to FIG. 5, the SMF 100 is a core network node apparatus responsible for the SMF as described above, and includes a network communication unit 110, a storage unit 120, and a processing unit 130.

(1) Network Communication Unit 110

The network communication unit 110 receives a signal from a network, and transmits a signal to the network.

(2) Storage Unit 120

The storage unit 120 temporarily or permanently stores programs (instructions) and parameters for operations of the SMF 100 as well as various data. The program includes one or more instructions for the operations of the SMF 100.

(3) Processing Unit 130

The processing unit 130 provides various functions of the SMF 100. The processing unit 130 includes an obtaining unit 131, a first communication processing unit 133, and a second communication processing unit 135. For example, the first communication processing unit 133 performs processing related to communication with the NRF 200. The second communication processing unit 135 performs processing related to communication with the AMF 300. Note that the processing unit 130 may further include constituent elements other than these constituent elements. In other words, the processing unit 130 may also perform operations other than the operations of these constituent elements. Concrete operations of the obtaining unit 131, the first communication processing unit 133, and the second communication processing unit 135 will be described later in detail.

3.2. Configuration of NRF 200

Next, with reference to FIG. 6, an example of a configuration of the NRF 200 according to the first example embodiment will be described. FIG. 6 is a block diagram illustrating an example of a schematic configuration of the NRF 200 according to the first example embodiment. With reference to FIG. 6, the NRF 200 is a core network node apparatus responsible for the NRF as described above, and includes a network communication unit 210, a storage unit 220, and a processing unit 230.

(1) Network Communication Unit 210

The network communication unit 210 receives a signal from a network, and transmits a signal to the network.

(2) Storage Unit 220

The storage unit 220 temporarily or permanently stores programs (instructions) and parameters for operations of the NRF 200 as well as various data. The program includes one or more instructions for the operations of the NRF 200.

(3) Processing Unit 230

The processing unit 230 provides various functions of the NRF 200. The processing unit 230 includes a first communication processing unit 231, a second communication processing unit 233, and a registration processing unit 235. The first communication processing unit 231 performs processing related to communication with the SMF 100. The second communication processing unit 233 performs processing related to communication with the AMF 300. Note that the processing unit 230 may further include constituent elements other than these constituent elements. In other words, the processing unit 230 may also perform operations other than the operations of these constituent elements. Concrete operations of the first communication processing unit 231, the second communication processing unit 233, and the registration processing unit 235 will be described later in detail.

3.3. Configuration of AMF 300

Next, with reference to FIG. 7, an example of a configuration of the AMF 300 according to the first example embodiment will be described. FIG. 7 is a block diagram illustrating an example of a schematic configuration of the AMF 300 according to the first example embodiment. With reference to FIG. 7, the AMF 300 is a core network node apparatus responsible for the AMF as described above, and includes a network communication unit 310, a storage unit 320, and a processing unit 330.

(1) Network Communication Unit 310

The network communication unit 310 receives a signal from a network, and transmits a signal to the network.

(2) Storage Unit 320

The storage unit 320 temporarily or permanently stores programs (instructions) and parameters for operations of the AMF 300 as well as various data. The program includes one or more instructions for the operations of the AMF 300.

(3) Processing Unit 330

The processing unit 330 provides various functions of the AMF 300. The processing unit 330 includes a first communication processing unit 331 and a second communication processing unit 333. The first communication processing unit 331 performs processing related to communication with the NRF 200. The second communication processing unit 333 performs processing related to communication with the SMF 100. Note that the processing unit 330 may further include constituent elements other than these constituent elements. In other words, the processing unit 330 may also perform operations other than the operations of these constituent elements. Concrete operations of the first communication processing unit 331 and the second communication processing unit 333 will be described later in detail.

3.4. Operation Example

Next, an operation example of the first example embodiment will be described.

The SMF 100 (obtaining unit 131) obtains network function information including information elements respectively related to a plurality of network slices supported by the SMF 100. The SMF 100 (first communication processing unit 133) transmits the network function information to a network node apparatus responsible for the NRF 200 in the core network.

The NRF 200 (first communication processing unit 231) receives the network function information including the information elements respectively related to the plurality of network slices supported by the SMF 100 from the SMF 100. The NRF 200 (registration processing unit 235) performs registration of the network function information.

Moreover, the information elements respectively related to the plurality of network slices supported by the SMF 100 have been aggregated within the network function information according to a predetermined rule.

(1) Indication Range Using Identification Information of Network Slices

Specifically, the information elements respectively related to the plurality of network slices supported by the SMF 100 have been aggregated within the network function information according to a range indicated by identification information of the network slices.

More specifically, an information element related to identification of any of the network slices includes a Slice/Service Type (sst) and a Slice Differentiator (sd).

Figure 8:
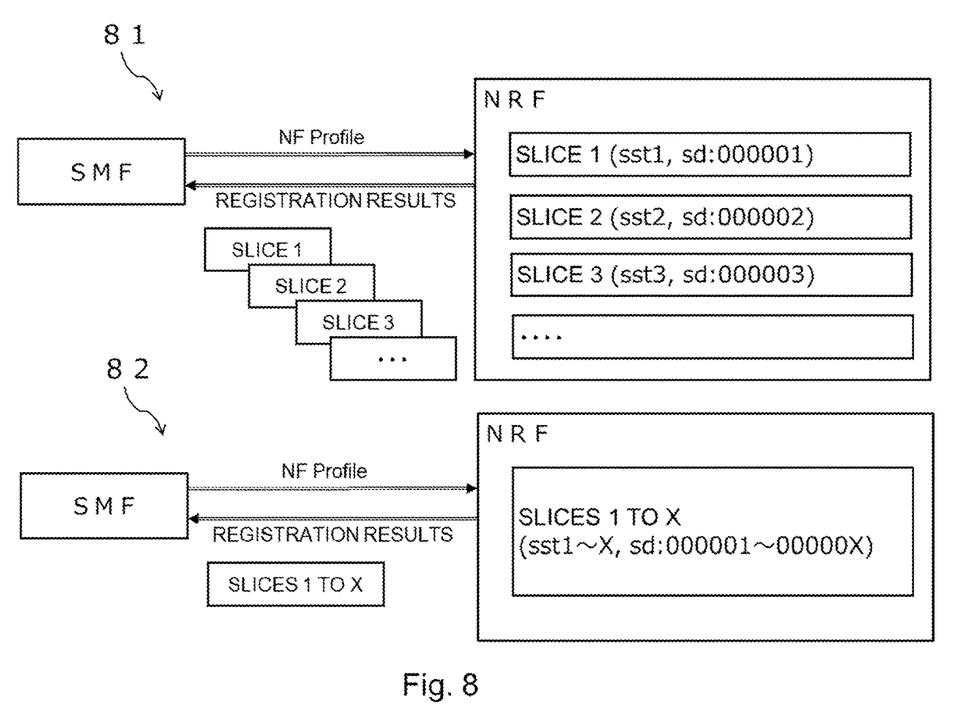
FIG. 8 is an explanatory diagram illustrating examples of concrete configurations of network function information.

FIG. 8 is an explanatory diagram illustrating examples of concrete configurations of the network function information. With reference to FIG. 8, in a reference example 81, information elements related to respective slices are stored in corresponding pieces of network function information NF Profile, respectively, and are transmitted from the SMF to the NRF. In contrast, in a present example 82, information elements respectively related to X slices have been aggregated within a single piece of network function information NF Profile in a range indicated by sst and sd, and are transmitted from the SMF to the NRF.

By employing range setting for slice information as described above, the amount of transmitting and receiving signals between the SMF and the NRF at the time of NF registration can be reduced.

(2) Data Network Name

The network function information may further include a plurality of Data network names (Dnns) respectively associated with the plurality of network slices supported by the SMF 100. In this case, the plurality of data network names has been aggregated within the network function information according to a predetermined rule. More specifically, the plurality of data network names has been aggregated within the network function information depending on whether a suffix matching condition is satisfied among the names.

Figure 9:
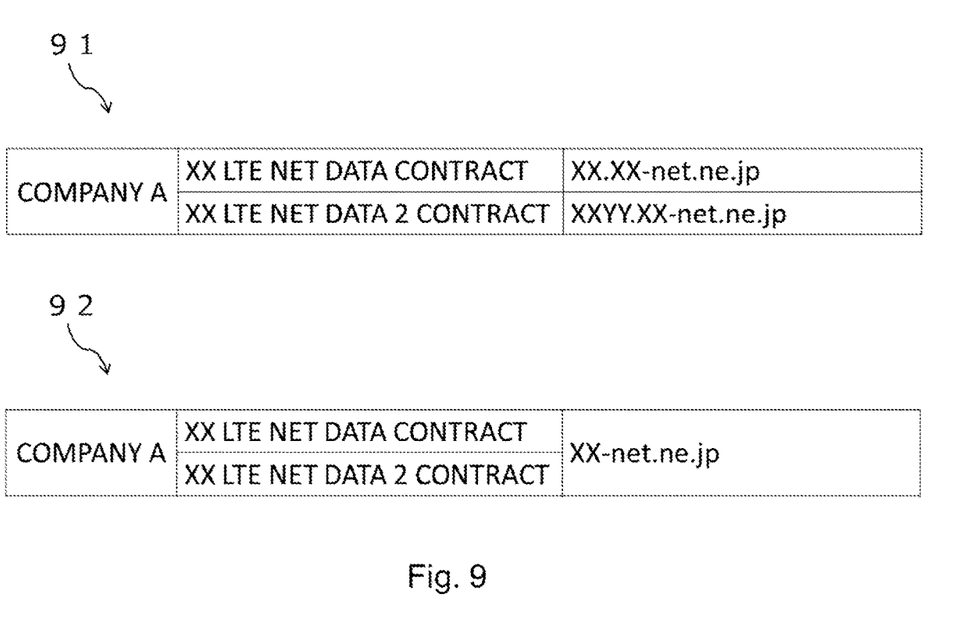
FIG. 9 is an explanatory diagram illustrating examples of configurations of the network function information including the data network names.

FIG. 9 is an explanatory diagram illustrating examples of configurations of the network function information including the data network names. With reference to FIG. 9, as illustrated in a reference example 91, for example, it is assumed that there are two data network names with respect to data contracts of company A being a communication operator. In this case, in a present example 92, a suffix matching part (XX-net.ne.jp) between the two data network names is registered as the data network name. With this, the amount of data to be registered can be reduced, and processing performance can be enhanced.

(3) Discovery Request

Next, a procedure of a network function discovery request which is requested to the NRF that has registered the network function information of the SMF 100 will be described.

In this case, first, the AMF 300 (first communication processing unit 331) transmits, to the NRF 200, network function discovery request information with respect to the SMF as a target to be connected by the AMF 300.

Next, the NRF 200 (second communication processing unit 233) receives the network function discovery request information from the AMF. Then, the NRF 200 (second communication processing unit 233) transmits information associated with the network function information to the AMF 300, in response to the network function discovery request information.

Figure 10:
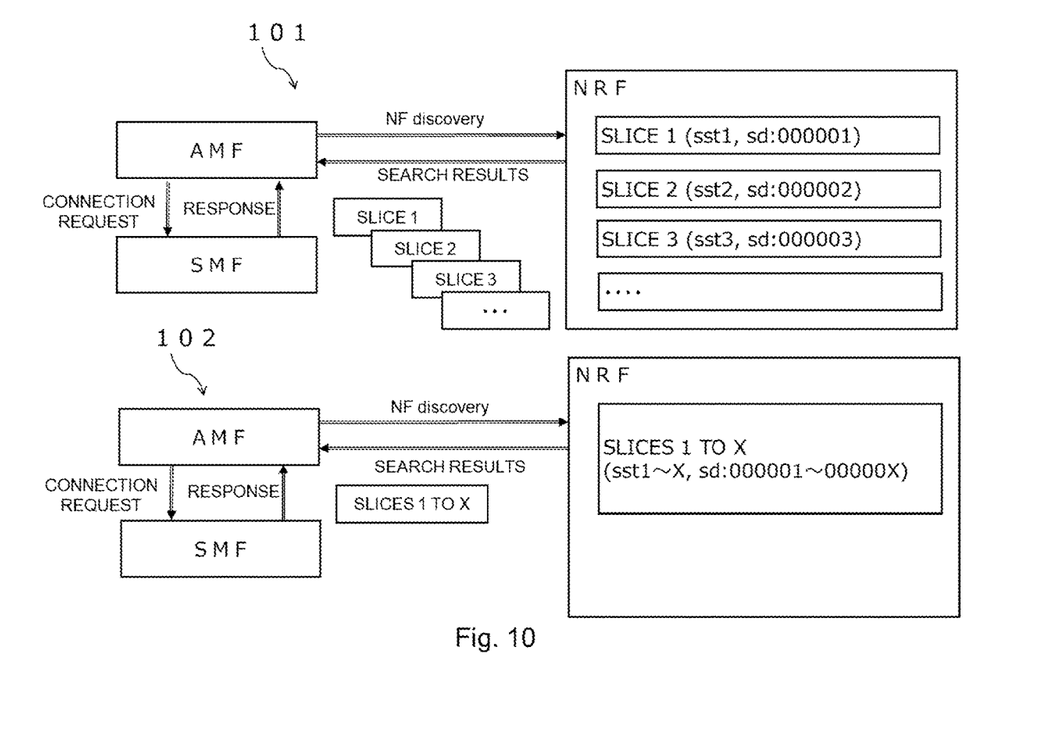
FIG. 10 is an explanatory diagram illustrating examples of information of a network function discovery request.

FIG. 10 is an explanatory diagram illustrating examples of information of the network function discovery request. With reference to FIG. 10, in a reference example 101, individual network function discovery requests NF discovery associated with respective slices to be requested by the AMF are transmitted from the AMF to the NRF. Then, individual pieces of network function information are returned from the NRF to the AMF as search results.

In contrast, in a present example 102, a single network function discovery request NF discovery associated with X slices to be requested by the AMF is transmitted from the AMF to the NRF. Then, a single piece of network function information is returned from the NRF to the AMF as search results.

By employing range setting for slice information as described above, the number of times of search between the AMF and the NRF at the time of NF discovery can be reduced.

(4) Example Alteration

For example, the information elements respectively related to the slices need not be solely configured based on range setting as described above, and may be configured based on a pattern using a mathematical expression or the like, for example.

4. SECOND EXAMPLE EMBODIMENT

Figure 11:
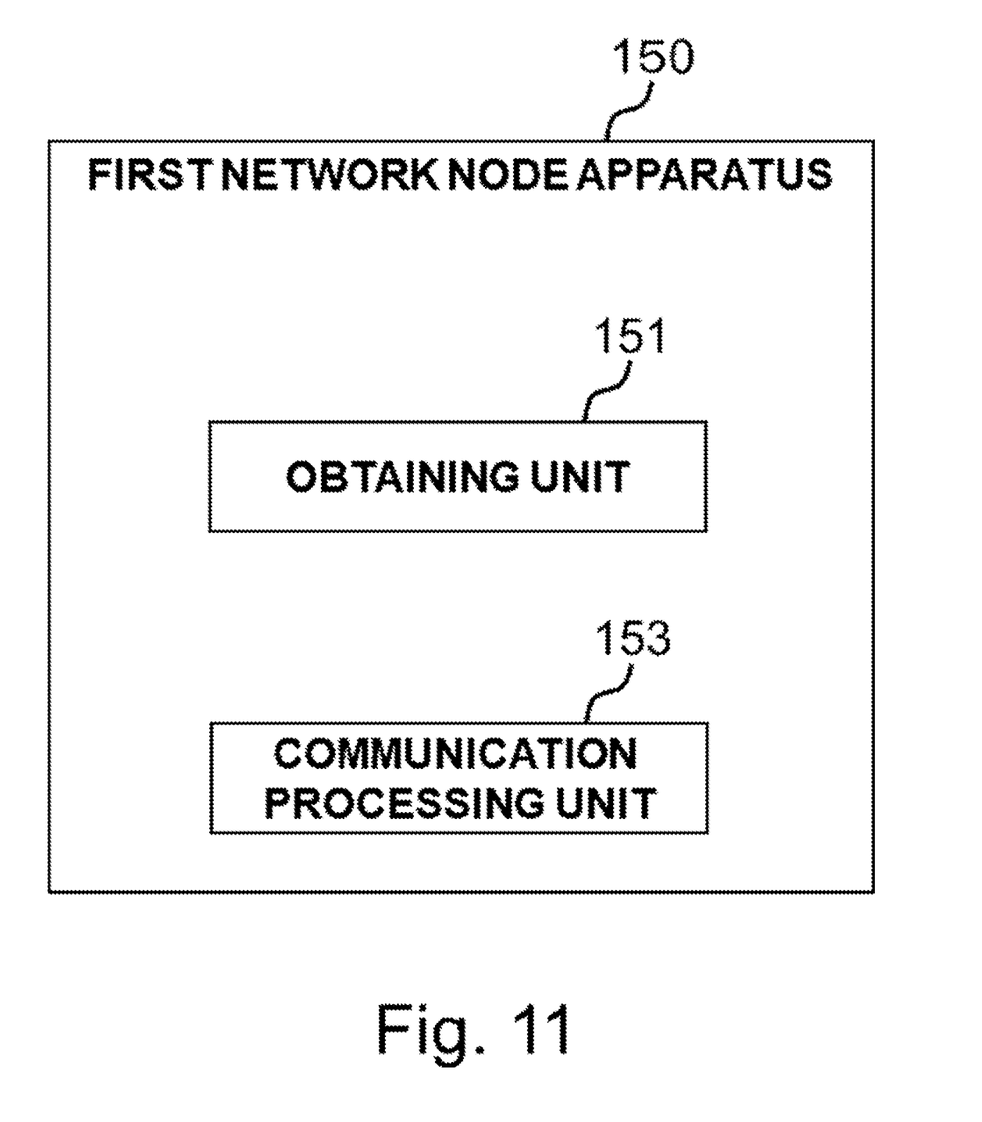
FIG. 11 is a block diagram illustrating an example of a schematic configuration of a first network node apparatus 150 according to a second example embodiment.
Figure 12:
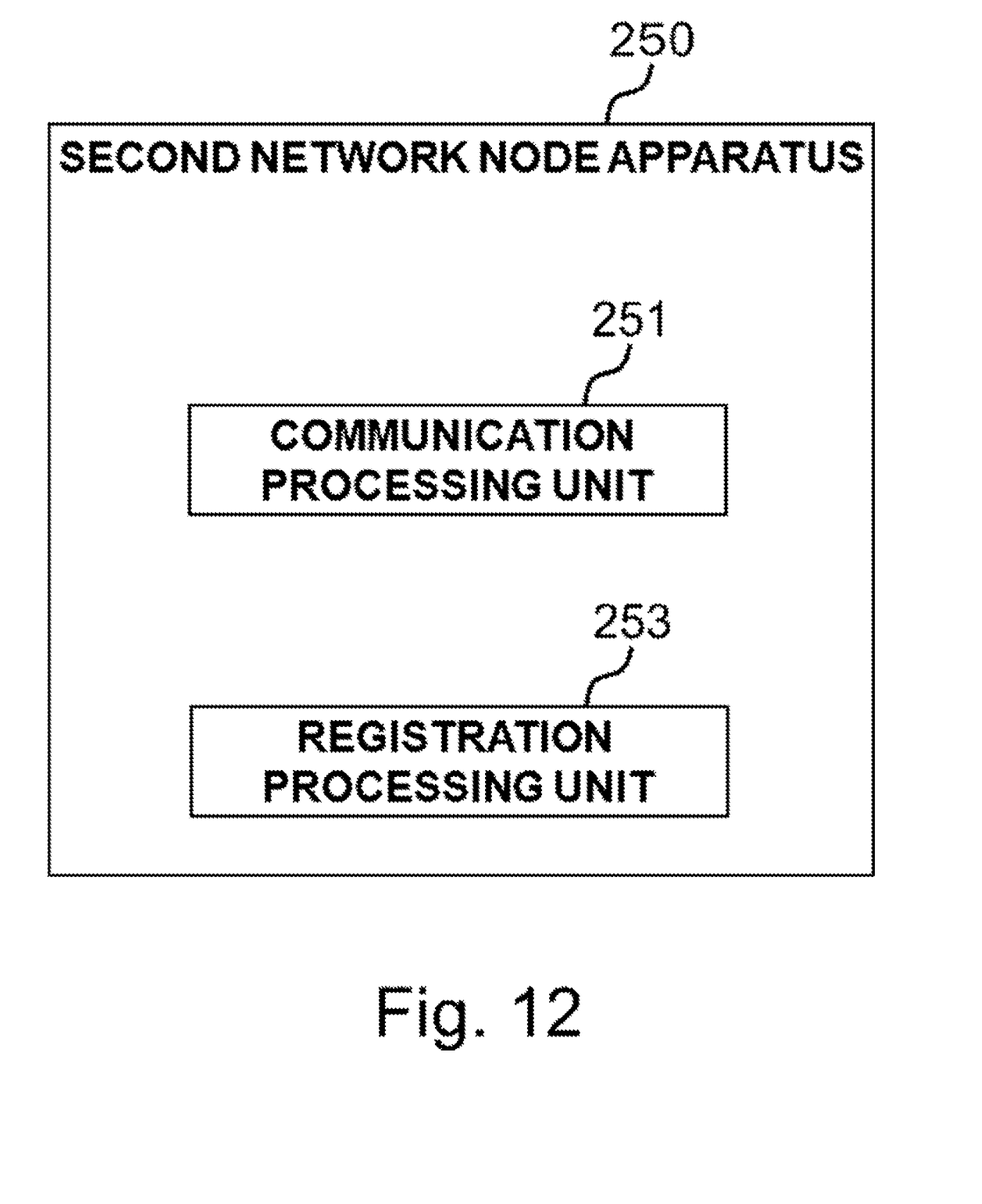
FIG. 12 is a block diagram illustrating an example of a schematic configuration of a second network node apparatus 250 according to the second example embodiment.

Next, with reference to FIG. 11 and FIG. 12, a second example embodiment of the present invention will be described. The above-described first example embodiment is a concrete example embodiment, whereas the second example embodiment is a more generalized example embodiment.

4.1. Configuration of First Network Node Apparatus 150

First, with reference to FIG. 11, an example of a configuration of a first network node apparatus 150 according to the second example embodiment will be described. FIG. 11 is a block diagram illustrating an example of a schematic configuration of the first network node apparatus 150 according to the second example embodiment. With reference to FIG. 11, the first network node apparatus 150 includes an obtaining unit 151 and a communication processing unit 153. Concrete operations of the obtaining unit 151 and the communication processing unit 153 will be described later.

The obtaining unit 151 and the communication processing unit 153 may be implemented with the same processor or may be implemented with separate processors. The obtaining unit 151 and the communication processing unit 153 may include a memory that stores a program (instructions) and one or more processors that can execute the program (instructions), and the one or more processors may perform operations of the obtaining unit 151 and the communication processing unit 153. The program may be a program for causing the processor(s) to execute the operations of the obtaining unit 151 and the communication processing unit 153.

4.2. Configuration of Second Network Node Apparatus 250

Next, with reference to FIG. 12, an example of a configuration of a second network node apparatus 250 according to the second example embodiment will be described. FIG. 12 is a block diagram illustrating an example of a schematic configuration of the second network node apparatus 250 according to the second example embodiment. With reference to FIG. 12, the second network node apparatus 250 includes a communication processing unit 251 and a registration processing unit 253. Concrete operations of the communication processing unit 251 and the registration processing unit 253 will be described later.

The communication processing unit 251 and the registration processing unit 253 may be implemented with the same processor or may be implemented with separate processors. The communication processing unit 251 and the registration processing unit 253 may include a memory that stores a program (instructions) and one or more processors that can execute the program (instructions), and the one or more processors may perform operations of the communication processing unit 251 and the registration processing unit 253. The program may be a program for causing the processor(s) to execute the operations of the communication processing unit 251 and the registration processing unit 253.

4.3. Operation Example

Next, technical features of the second example embodiment will be described.

In the second example embodiment, the first network node apparatus 150 is a network node apparatus responsible for a Session Management Function (SMF) in a core network. The first network node apparatus 150 (obtaining unit 151) obtains network function information including information elements respectively related to a plurality of network slices supported by the SMF. The first network node apparatus 150 (communication processing unit 153) transmits the network function information to a network node apparatus responsible for a Network Repository Function (NRF) in the core network.

In the second example embodiment, the second network node apparatus 250 is a network node apparatus responsible for a Network Repository Function (NRF) in a core network. The second network node apparatus 250 (communication processing unit 251) receives, from a network node apparatus responsible for a Session Management Function (SMF) in the core network, network function information including information elements respectively related to a plurality of network slices supported by the SMF. The second network node apparatus 250 (registration processing unit 253) performs registration of the network function information.

Moreover, according to the second example embodiment, the information elements respectively related to the plurality of network slices supported by the SMF have been aggregated within the network function information according to a predetermined rule.

For example, the first network node apparatus 150 may perform operations of the SMF 100 according to the first example embodiment. The second network node apparatus 250 may perform operations of the NRF 200 according to the first example embodiment.

The second example embodiment has been described above. According to the second example embodiment, for example, the information elements respectively related to the network slices supported by the SMF can be appropriately registered with the NRF.

5. OTHER EXAMPLE EMBODIMENTS

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

A module for one of the apparatuses including the constituent elements of the network node apparatus described in the Specification may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

Supplementary Note 1

A network node apparatus responsible for a Session Management Function (SMF) in a core network, the network node apparatus comprising:
an obtaining unit configured to obtain network function information including information elements respectively related to network slices supported by the SMF; and
a communication processing unit configured to transmit the network function information to a network node apparatus responsible for a Network Repository Function (NRF) in the core network, wherein
the information elements respectively related to the network slices supported by the SMF have been aggregated within the network function information according to a predetermined rule.

Supplementary Note 2

The network node apparatus according to supplementary note 1, wherein the information elements respectively related to the network slices supported by the SMF have been aggregated within the network function information according to a range indicated by identification information of the network slices.

Supplementary Note 3

The network node apparatus according to supplementary note 2, wherein an information element related to identification of any of the network slices includes a Slice/Service Type (sst).

Supplementary Note 4

The network node apparatus according to supplementary note 2, wherein an information element related to identification of any of the network slices includes a Slice Differentiator (sd).

Supplementary Note 5

The network node apparatus according to supplementary note 1, wherein the network function information is information for requesting registration of the network function information with the NRF.

Supplementary Note 6

The network node apparatus according to supplementary note 1, wherein
the network function information further includes Data network names (Dnns) respectively associated with the network slices supported by the SMF, and
the data network names have been aggregated within the network function information according to a predetermined rule.

Supplementary Note 7

The network node apparatus according to supplementary note 6, wherein the data network names have been aggregated within the network function information depending on whether a suffix matching condition is satisfied among the data network names.

Supplementary Note 8

A network node apparatus responsible for a Network Repository Function (NRF) in a core network, the network node apparatus comprising:
a communication processing unit configured to receive, from a network node apparatus responsible for a Session Management Function (SMF) in the core network, network function information including information elements respectively related to network slices supported by the SMF; and
a registration processing unit configured to perform registration of the network function information, wherein
the information elements respectively related to the network slices supported by the SMF have been aggregated within the network function information according to a predetermined rule.

Supplementary Note 9

The network node apparatus according to supplementary note 8, wherein
the communication processing unit receives network function discovery request information from a network node apparatus responsible for an Access and Mobility management Function (AMF) in the core network, and
the communication processing unit transmits information associated with the network function information to the network node apparatus responsible for the AMF, in response to the network function discovery request information.

Supplementary Note 10

A method performed by a network node apparatus responsible for a Session Management Function (SMF) in a core network, the method comprising:
obtaining network function information including information elements respectively related to network slices supported by the SMF; and
transmitting the network function information to a network node apparatus responsible for a Network Repository Function (NRF) in the core network, wherein
the information elements respectively related to the network slices supported by the SMF have been aggregated within the network function information according to a predetermined rule.

Supplementary Note 11

A method performed by a network node apparatus responsible for a Network Repository Function (NRF) in a core network, the method comprising:
receiving, from a network node apparatus responsible for a Session Management Function (SMF) in the core network, network function information including information elements respectively related to network slices supported by the SMF; and
performing registration of the network function information, wherein
the information elements respectively related to the network slices supported by the SMF have been aggregated within the network function information according to a predetermined rule.

Information elements respectively related to network slices supported by an SMF can be appropriately registered with an NRF.

What is claimed is:

1. A network node apparatus responsible for a Session Management Function (SMF) in a core network, the network node apparatus comprising:
   a memory storing instructions; and
   one or more processors configured to execute the instructions to:
   obtain network function information including a plurality of information elements respectively related to a plurality of network slices supported by the SMF; and
   transmit the network function information to a network node apparatus responsible for a Network Repository Function (NRF) in the core network, wherein
   the plurality of information elements respectively related to the plurality of network slices supported by the SMF have been aggregated within one row of the network function information according to a predetermined rule, and according to a range indicated by identification information of the network slices, the identification information relates to a plurality of Slice/Service Types (ssts) and a plurality of Slice Differentiators (sds).

2. The network node apparatus according to claim 1, wherein the network function information is information for requesting registration of the network function information with the NRF.

3. The network node apparatus according to claim 1, wherein
   the network function information further includes Data network names (Dnns) respectively associated with the network slices supported by the SMF, and
   the data network names have been aggregated within the network function information according to a predetermined rule.

4. The network node apparatus according to claim 3, wherein the data network names have been aggregated within the network function information depending on whether a suffix matching condition is satisfied among the data network names.

5. A network node apparatus responsible for a Network Repository Function (NRF) in a core network, the network node apparatus comprising:
   a memory storing instructions; and
   one or more processors configured to execute the instructions to:
   receive, from a network node apparatus responsible for a Session Management Function (SMF) in the core network, network function information including a plurality of information elements respectively related to a plurality of network slices supported by the SMF; and
   perform registration of the network function information, wherein
   the plurality of information elements respectively related to the plurality of network slices supported by the SMF have been aggregated within one row of the network function information according to a predetermined rule, and according to a range indicated by identification information of the network slices, the identification information relates to a plurality of Slice/Service Types (ssts) and a plurality of Slice Differentiators (sds).

6. The network node apparatus according to claim 5, wherein the one or more processors are configured to execute the instructions to:
   receive network function discovery request information from a network node apparatus responsible for an Access and Mobility management Function (AMF) in the core network, and
   transmit information associated with the network function information to the network node apparatus responsible for the AMF, in response to the network function discovery request information.

7. A method performed by a network node apparatus responsible for a Session Management Function (SMF) in a core network, the method comprising:
   obtaining network function information including a plurality of information elements respectively related to a plurality of network slices supported by the SMF; and
   transmitting the network function information to a network node apparatus responsible for a Network Repository Function (NRF) in the core network, wherein
   the plurality of information elements respectively related to the plurality of network slices supported by the SMF have been aggregated within one row of the network function information according to a predetermined rule, and according to a range indicated by identification information of the network slices, the identification information relates to a plurality of Slice/Service Types (ssts) and a plurality of Slice Differentiators (sds).

* * * * *